March 4, 1969
J. M. SWEENEY
3,430,886
BOBBIN FOR FISHING LINES HAVING MEANS FOR
ATTACHMENT TO SIMILAR BOBBINS
Filed Nov. 10, 1966
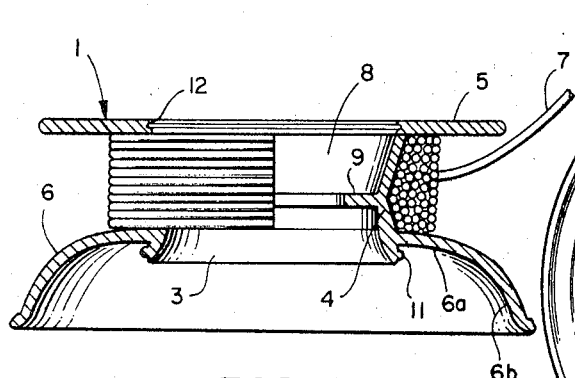
FIG. 1
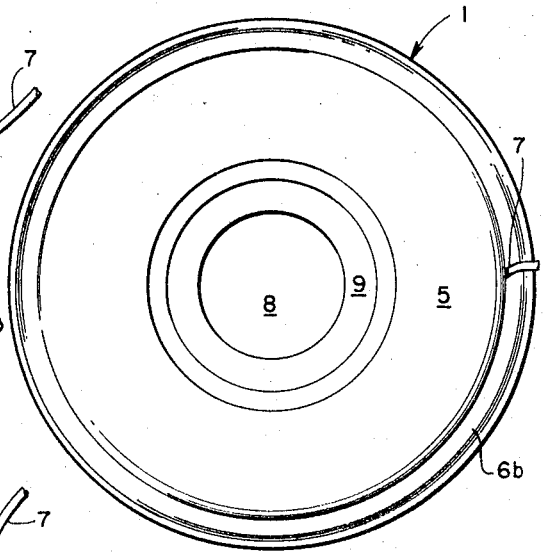
FIG. 2
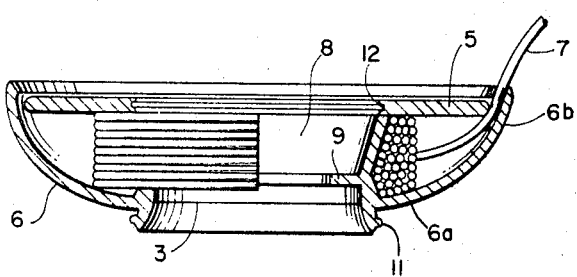
FIG. 3
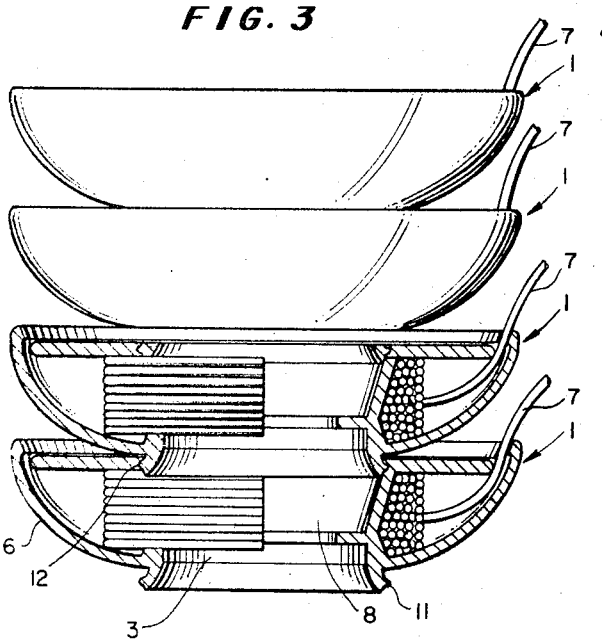
FIG. 4
FIG. 5
INVENTOR.
JOHN M. SWEENEY
BY
*McGrew & Edwards*
ATTORNEYS

United States Patent Office 3,430,886
Patented Mar. 4, 1969

3,430,886
BOBBIN FOR FISHING LINES HAVING MEANS FOR ATTACHMENT TO SIMILAR BOBBINS
John M. Sweeney, Denver, Colo., assignor to Wright & McGill Co., Denver, Colo., a corporation of Colorado
Filed Nov. 10, 1966, Ser. No. 593,519
U.S. Cl. 242—118.7                8 Claims
Int. Cl. B65h 75/14, 55/00, 75/02

ABSTRACT OF THE DISCLOSURE

Bobbin for filament such as fishing leader including a hub and heads extending outwardly at end of the hub. One head having a curling portion of flexible material establishing a surface in overlying and spaced relationship to the peripheral edge of the other radially extending flat head to cover the winding of filament on the hub when curled inwardly to a closed position and extending away from the flat head to expose the winding when curled to an open position. Flexible joint for connecting a plurality of similar bobbins including a projecting portion extending radially outwardly from the hub at one end and a recessed portion extending radially outwardly from the hub at the other end, said portions shaped for mating relationship therebetween.

---

This invention relates to bobbins for holding various forms of filament and which are particularly suitable for holding fishing leader and the like.

Bobbins provide support for many types of filament windings such as thread, fishing leader, line, ribbon and the like and permit quick and easy winding of the filament thereon and unwinding of the filament therefrom.

For best results a bobbin for fishing leader should be small and compact in size to permit carriage in a tackle box and on the person such as in a pocket, it should be suitable for accommodating a wide range of pound tests of leader and also permit the manufacturer to easily wind the leader thereon and the user to unwind the leader therefrom. Heretofore, bobbins for fishing leader have usually employed inflexible ends or heads formed on the hub portion with a central narrow slit through which the loose end of the leader extends for winding and unwinding with the loose end usually secured in a slot on the side of the bobbin. Such prior art bobbins have generally employed smooth exterior surfaces with no means for interlocking similar bobbins.

Accordingly, it is an object of this invention to provide a simple, durable and easy-to-use bobbin for holding various forms of filament.

Another object of this invention is to provide a leader bobbin which can be loaded in a fully exposed position and then closed to prevent the winding from unraveling while in storage, transport, or on sales display.

Still another object of this invention is to provide a novel bobbin which can be formed of various shapes and diameters and which may be interlocked in multiples so that a fisherman can carry and easily select various pounds of tests of leader therefrom.

Other objects, advantages and capabilities of the invention will become apparent from the following description taken in conjunction with the accompanying drawings in which like parts bear similar reference numerals. In the drawings:

FIG. 1 is an end elevation view partially in section of a bobbin embodying my invention shown with the flexible head portion moved to an open position to permit winding and unwinding of the filament on the hub portion;

FIG. 2 is a side elevation view of the bobbin shown in FIG. 1 as viewed from the side opposite the opened flexible head portion;

FIG. 3 is an end elevation view partially in section of the bobbin shown in FIG. 1 with the flexible head portion moved to a closed position to enclose the winding of filament and hold the loose end of the filament between the peripheral ends of the heads;

FIG. 4 is a side elevation view partially broken away of the bobbin shown in FIG. 3 as viewed from the side of the closed flexible head portion; and FIG. 5 is an end elevation view of a plurality of bobbins shown in FIGS. 1–4 joined in interlocking arrangement by insertion of the flexible projecting portion of one into the recessed portion of the other.

Referring now to the drawings there is shown a bobbin generally designated by numeral 1. This bobbin 1 comprises a body 3 which may be formed in various shapes such as octagonal or like multisided configurations or circular as illustrated. Body 3 includes an elongated central hub portion 4 and a head 5 and 6 at each end of the hub portion for supporting and holding of a winding of filament 7 on the hub portion 4 between the heads 5 and 6. Body 3 includes a central aperture 8 extending through the hub portion and heads which has a restricted intermediate portion provided by a rib portion 9 formed on the inner surface of the hub portion.

Head 5 is substantially flat and extends radially outwardly from the hub portion 4. Head 6 includes a flat inner portion 6a which is generally parallel to head 5 and a curved or curling outer portion 6b which is of a flexible material capable of being shaped or moved from an open position (FIGS. 1 and 2), in which the winding is fully exposed to a closed position (FIGS. 3 and 4), in which the winding is fully covered. In the open position the flexible portion 6b extends or flares outwardly from the associated end of the hub portion to form an essentially concave surface with its outer peripheral edge a substantial distance outwardly from its associated hub portion. In the closed position the flexible portion 6b extends inwardly toward head 5 to form an essentially convex surface having an inner peripheral surface in overlying and close clearance with the outer peripheral edge of head 5. In this manner the loose end of the filament 7 is held in a friction grip between the peripheral edge of the head 5 and the inner peripheral surface of flexible portion 6b.

The bobbins 1 are provided with a coupling or interlocking feature which permits a plurality of similar bobbins to be interconnected in a stacked relationship as shown in FIG. 5. This interlocking feature includes a radially extending projecting portion 11 of a flexible material preferably cylindrical in shape as shown at the end of the hub portion adjoining head 6 and outwardly disposed therefrom. The outer dimension of projecting portion 11 is slightly greater than the inner dimension of the central aperture 8 defined by a preferably cylindrical inner surface in the body 3 at the end of the hub portion adjoining head 5 so that the projecting portion 11 may be placed by flexible insertion into the central aperture of a second bobbin. The inner surface of the body defining aperture 8 is preferably of a flexible material to assist in the interlocking function. The central aperture is preferably provided with a mating recess portion 12 extending radially thereof having a shape similar to projecting portion 11 of an adjoining bobbin so the projecting portion will interlock in the recess portion.

With the interlocking feature as shown in FIG. 5 and as above described it is apparent that each bobbin may be wound with a different pound test of leader to provide a wide range of selection. While it is preferred to wind and unwind the leader from the bobbins when detached, it is apparent that with the projecting portion 11 extending a substantial distance beyond the hub portion there is sufficient clearance between interconnected bobbins to permit unwinding the filament 7 against the friction grip between peripheral edge 5 and flexible portion 6b during interconnection to an adjoining bobbin.

The head portion 6b and the projecting portion 11 above described as of a flexible material may be of various types of flexible plastics. I prefer to form the entire body 3 in a single mold and of the same material and a polyethylene material has been found to provide the best results. This material so formed has been found to provide a durable bobbin which is sufficiently flexible to permit the head portion 6b to be shaped or curled to and from the open and closed positions and the flexible insertion of the projecting portion 11 within the recessed portion 12 many times without breakage or substantial deformation.

While I have particularly shown and described one particular embodiment of the invention, it is understood that the present disclosure has been made only by way of example and that changes in details of construction may be resorted to without departing from the spirit and scope of the invention.

I claim:

1. A bobbin for fishing leader and similar filament comprising a body including a hub portion for supporting a winding of filament, a first head having a substantially flat portion extending outwardly from one end of the hub portion, a second head having a curling portion of a flexible material extending outwardly from the other end of the hub portion and establishing a surface portion overlying and in close clearance with the peripheral edge of said flat head portion so as to enclose a winding of filament on the hub portion when curled inwardly to a first position, and extending outwardly from the hub portion in substantially spaced relation to said first head portion when curled outwardly to a second position to permit winding of the filament on the hub portion.

2. A bobbin as set forth in claim 1 wherein all of said body is formed of the same plastic material.

3. A bobbin as set forth in claim 2 wherein said plastic material is polyethylene.

4. A bobbin for fishing leader and similar filament comprising a body including a hub portion for supporting a winding of filament, a first head having a substantially flat portion extending radially outwardly of the longitudinal axis of the hub portion from one end of the hub portion, a second head having a portion extending radially outwardly and curving at its outer end from the other end of said hub portion, said second head portion being of a flexible material capable of shaping to a first position and having a portion projecting beyond the midpoint of the hub portion as measured along its length and establishing a surface in close clearance with the peripheral edge of said first head portion so as to enclose a winding of filament on the hub portion, and said flexible material being capable of shaping to a second position extending outwardly from the hub portion in substantially spaced relation to said first head portion to permit winding of the filament on the hub portion.

5. A bobbin for fishing leader and similar filament comprising a body including an integral hub portion for supporting a winding of filament, a first head having a substantially flat portion extending outwardly from and formed as an integral part with one end of the hub portion, a second head having a curling portion of a flexible material extending outwardly from the other end of the hub portion and establishing a surface portion overlying and in close clearance with the peripheral edge of said flat head portion so as to enclose a winding of filament on the hub portion and hold a loose end of the filament between said peripheral edge and said surface portion when curled inwardly to a first position, and extending outwardly from the hub portion in substantially spaced relation to said first head portion when curled outwardly to a second position to permit winding of the filament on the hub portion.

6. A bobbin for fishing leader and similar filament comprising a body including a hub portion for supporting a winding of filament, a first head having a substantially flat portion extending outwardly from one end of the hub portion, a second head having a curling portion of a flexible material extending outwardly from the other end of the hub portion and establishing a surface portion overlying and in close clearance with the peripheral edge of said flat head portion so as to enclose a winding of filament on the hub portion when curled inwardly to a first position, and extending outwardly from the hub portion in substantially spaced relation to said first head portion when curled outwardly to a second position to permit winding of the filament on the hub portion, said body having a central aperture extending through the hub portion and a projecting portion of a flexible material extending radially outwardly from an outer surface of said hub portion at one end thereof, said hub portion having a recessed portion extending radially thereof at its end oppositely of said projecting portion and shaped for slidably receiving a projecting portion in a mating relationship for interconnection of said body with a second corresponding bobbin by flexible insertion of the projecting portion within the opposite recessed portion of the second bobbin.

7. A bobbin as set forth in claim 6 wherein said projecting portion and said recessed portion are substantially annular in shape.

8. A bobbin as set forth in claim 6 wherein the portion of said body defining said recessed portion is of a flexible material for receiving the projecting portion of a similar bobbin in a flexing relation.

References Cited

UNITED STATES PATENTS

| 2,545,145 | 3/1951 | Hoyle | 242—118.4 |
| 2,712,804 | 7/1955 | Cone | 242—118.7 |
| 2,834,507 | 5/1958 | Metzler et al. | 242—55.42 X |
| 3,104,848 | 9/1963 | Joffe | 242—71.8 |
| 3,136,415 | 6/1964 | Sandstrom | 206—52 |

GEORGE F. MAUTZ, *Primary Examiner.*

U.S. Cl. X.R.

206—52; 242—118.41